US006993518B2

(12) United States Patent
Brinker et al.

(10) Patent No.: US 6,993,518 B2
(45) Date of Patent: Jan. 31, 2006

(54) METHOD AND SYSTEM FOR SYSTEMATICALLY DIAGNOSING DATA PROBLEMS IN A DATABASE

(75) Inventors: Brian L. Brinker, Acworth, GA (US); Brad Hansen, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 09/864,719

(22) Filed: May 24, 2001

(65) Prior Publication Data

US 2003/0033289 A1   Feb. 13, 2003

(51) Int. Cl.
  *G06F 17/30* (2006.01)
(52) U.S. Cl. .............................. 707/3; 707/5; 707/102; 714/25
(58) Field of Classification Search ................ 707/1–7, 707/102, 104.1, 101; 714/25–27
  See application file for complete search history.

(56) References Cited

U.S. PATENT DOCUMENTS

| | | | | |
|---|---|---|---|---|
| 5,450,545 A | * | 9/1995 | Martin et al. ............... | 717/109 |
| 5,701,400 A | * | 12/1997 | Amado ......................... | 706/45 |
| 5,875,440 A | * | 2/1999 | Cooperman et al. ......... | 706/50 |
| 5,937,402 A | | 8/1999 | Pandit .......................... | 707/4 |
| 6,014,639 A | | 1/2000 | Fohn et al. ................... | 705/27 |
| 6,301,579 B1 | * | 10/2001 | Becker ......................... | 707/102 |
| 6,502,084 B1 | * | 12/2002 | Boleyn et al. ................ | 706/45 |
| 6,522,995 B1 | * | 2/2003 | Conti et al. .................. | 702/186 |
| 6,553,366 B1 | * | 4/2003 | Miller et al. .................. | 707/2 |
| 6,557,115 B2 | * | 4/2003 | Gillenwater et al. ......... | 714/25 |
| 6,581,054 B1 | * | 6/2003 | Bogrett ......................... | 707/4 |
| 2002/0101920 A1 | * | 8/2002 | Choi et al. ................... | 375/240 |
| 2002/0177977 A1 | * | 11/2002 | Scarlat et al. ............... | 702/186 |

OTHER PUBLICATIONS

Author: John J. Rofrano, Title: "Java Portability by Design", Date: Jun. 1999, pp.: 34, 36, 37, 38, 39 and 40, Publication: Dr. Dobb's Journal.

* cited by examiner

*Primary Examiner*—Leslie Wong
(74) *Attorney, Agent, or Firm*—Synnestvedt & Lechner LLP; John R. Pivnichny

(57) ABSTRACT

A method and system for diagnosing data problems in a database. The system provides a test program for running simultaneously a series of tests on the database. In the test program, a set of queries corresponding to the series of tests are defined. Then these queries are refined as fields of a larger query, such that the test results appear merely as small tables. This technique can be implemented using SQL commands "WITH" and "LEFT OUTER JOIN." The test program is configured to display automatically all the results from the tests in one table. By simply running the test program and viewing the table showing all the test results, an operator is able to diagnose easily the nature and location of the data problem(s) in the database.

17 Claims, 3 Drawing Sheets

FIG. 2

Outcome Table

| Key | Test1 | Test2 | Test3 | Test4 | Test5 |
|-----|-------|-------|-------|-------|-------|
| 011 | x     |       |       |       |       |
| 012 |       |       | x     | x     |       |
| 013 | x     |       |       |       | x     |

METHOD AND SYSTEM FOR SYSTEMATICALLY DIAGNOSING DATA PROBLEMS IN A DATABASE

BACKGROUND OF THE INVENTION

1. Field of the Invention

The present invention relates to data problem diagnosing tools and, more particularly, to a method and system for systematically diagnosing data problems in a database.

2. Description of the Related Art

DataBase Administrators (DBAs) monitor and maintain databases to ensure accurate and consistent storage of data in the databases. DBAs load and retrieve data to and from the database using a programming language called SQL (Structured Query Language) which is well known to DBAs. In a database, data are stored in tables. Each table has a set of rows and fields (columns). Each row in the table is identifiable by one or a combination of unique identifiers known as "keys" and each field in the table is identifiable by a field name. A field containing the keys is known as a "key field." DBAs and database programmers utilize keys and field names to retrieve particular data from a database table.

Conventionally, when the integrity of data stored in a database is questioned, the DBA attempts to diagnose the nature of the problem and/or the exact location of the problem using one of the standard SQL statements known as "SELECT." A SELECT statement is an SQL command for retrieving data from one or more tables of the database. Without knowing the exact nature or location of the data problem in the database, the DBA must speculate on where the problem may lie and use the SELECT statement to retrieve data from the potential problem areas of the database. The DBA compares the retrieved data with some source to determine whether inaccurate or inconsistent data are stored in the database, and whether any data is missing from a particular location in the database. This process is repeated until the DBA can diagnose properly the data problem in the database. As a result, the conventional process of diagnosing data problems in the database can be extremely time consuming and inefficient. Furthermore, the DBA must keep track of any data retrieved during this process and manually compare data sets to determine the exact nature and/or location of the data problem. This also can be tedious and is prone to human error.

Therefore, there is a need for an improved technique by which data integrity problems or other problems in a database can be diagnosed more quickly and more systematically, thereby overcoming problems encountered in conventional data problem diagnosing techniques for databases.

SUMMARY OF THE INVENTION

The present invention is directed to a method and system for systematically diagnosing data problems in a database which overcomes limitations encountered in conventional data problem diagnosing techniques for databases.

Particularly, the system of the present invention provides a test program for running simultaneously a set of tests on a database. In the test program, these tests are defined as queries. Then these queries are refined as parts of a larger query in a particular manner, such that the outcome of the queries (test results) appears merely as fields (columns) of tables. This technique can be implemented using a new SQL command, "WITH", which is defined in the SQL 1999 Standard set by ANSI/ISO (American Standards Institute I International Standards Organization). Then these fields of tables are queried again by using a well known SQL command "LEFT OUTER JOIN" on all key fields in the database to form a larger table, so that the results from the different tests can be displayed in one outcome table.

By simply running the test program and viewing the outcome table showing all the test results, an operator is able to diagnose easily the nature and location of the data problem(s) in the database.

BRIEF DESCRIPTION OF THE DRAWINGS

FIG. 2 is an example of an outcome table illustrating different test results according to the present invention.

DETAILED DESCRIPTION OF THE PREFERRED EMBODIMENTS

Figure 1:
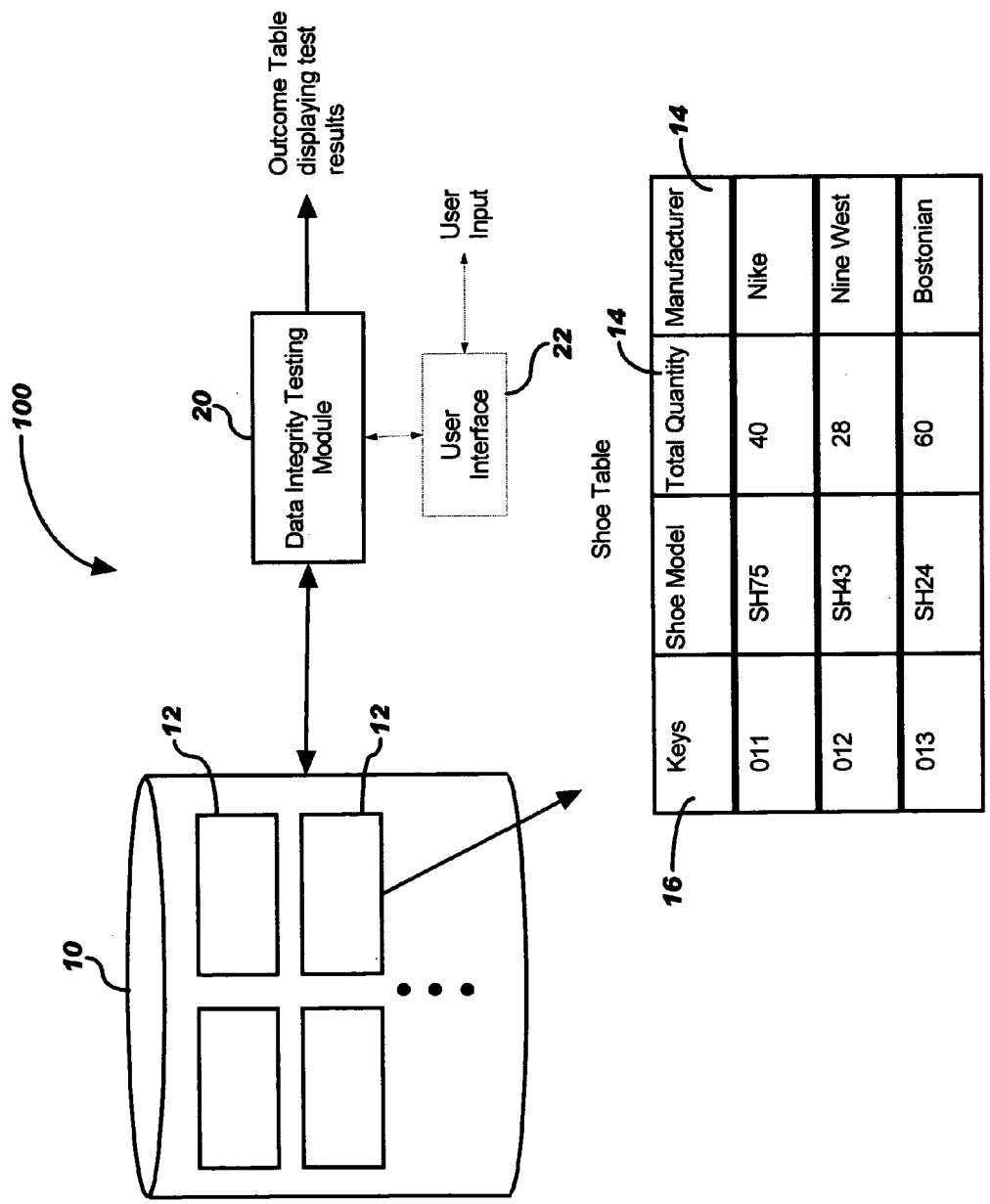
FIG. 1 is a diagram of a system for diagnosing data problems in a database according to one embodiment of the present invention.

In the drawings, the same reference numerals are used to indicate the same components.

FIG. 1 is a diagram of a system 100 for diagnosing data problems in a database according to one embodiment of the present invention. As shown in FIG. 1, the system 100 includes at least one database 10 and a data integrity testing module 20, operatively coupled. The database 10 includes a plurality of tables 12 for storing data therein. Each table 12 includes rows of data categorized by different fields (columns). Each row in the table is assigned to one or a combination of key values and each field is assigned to a field name. For example, a table 12 named "Shoe" stored in the database 10 has a key field 16 for identifying key values associated with each row, and fields 14 such as "Shoe Model", "Total Quantity", and "Manufacturer." By identifying the key value and the field name, a particular data record stored in the table can be accessed. For instance, by identifying the key value to be 011 and the field name to be "Shoe Model", the data record of "SH75" can be accessed from the Shoe table. One skilled in the art would readily appreciate that if the field names were guaranteed to be unique, then they could be used as keys if desired. All this database architecture is well known in the art.

The data integrity testing module 20 includes a computer program (referred to herein as a "test program") for simultaneously running a group of different tests on the database and a microprocessor or the like for controlling and executing the test program. The test program is written in SQL. In accordance with one embodiment, this test program is written by a programmer (or DBA) at the initial set-up of the system 100. To accomplish this task, the programmer identifies a group of different tests that the programmer desires to run systematically. The different tests may include, but are not limited, to a test of comparing data in the same fields of different tables in the database if the different tables are expected to have the same value and data type (e.g., both Tables 1 and 2 may have equivalent "Shoe Model" type fields), a test of verifying that data or accurate data actually exists in particular fields/rows of the tables, and a test of counting the number of items in particular fields/rows that satisfy certain conditions.

Once the desired tests are identified, the programmer writes the program based on the identified tests. Particularly, each of the identified tests is written as an SQL query and then these queries are refined as fields of a larger query. This is implemented using an SQL command "WITH", the use of which will be described below in more detail. The test program is also written so that it generates automatically a table identifying all the results from the different tests. This table is referred to herein as the "outcome" table. The generation of the outcome table can be implemented using a well-known SQL command "LEFT OUTER JOIN", the use of which will also be described below in more detail.

In response to instructions from a user such as the DBA or whenever data testing is desired for the database 10, the data integrity testing module 20 is configured to execute the test program on the database 10. The testing module 20 generates automatically the outcome table identifying all the different test results at one time. The outcome table allows the user to quickly understand the different test results and to identify the nature and/or location of data problems in the database.

In accordance with another embodiment, instead of pre-defining the test program in the system at the initial set-up of the system, the system is configured so that the user can select a set of tests to run on the database. That is, the user can formulate and run his preferred test program, instead of the predefined test program. This can be accomplished as follows. A user interface 22 (represented in dotted lines in FIG. 1), which is coupled to the data integrity testing module 20, is provided in the system 100. The user interface includes a display device, an input unit, a processor, etc., for communicating user inputs to the testing module 20. The user interface 22 is configured to display (e.g., on the display device) a list of predetermined tests from which the user can select. The user selects one or more of the desired tests from the list using, e.g., the input unit such as a keyboard.

Then, based on the selected tests, predetermined questions are displayed to the 20 user under control of the testing module 20. These questions may be about the relationship between various tables in the database, the fields or keys of the tables, expected values in these fields, conditions under which these tests should be run, and any other information pertaining to the database. These questions are predetermined and designed to obtain information needed to prepare a test program for running those tests selected by the user. Based on the user's input, the data integrity testing module 20 or some other component coupled to the system 100 generates a test program. This can be accomplished by providing the testing module 20 or other component with existing computer software for automatically generating the appropriate SQL syntax based the received user input and certain criteria. The generated test program is then stored in the testing module 20 and executed whenever desired as discussed above. It must be noted, however, that there is a performance tradeoff between the number of tests performed and the time required to execute these tests.

FIG. 2 is one example of an outcome table displaying the results of different tests that may be performed by the data integrity testing module 20 according to one embodiment of the present invention. In this example, the entire rows of data were tested using five different tests, Tests 1, 2, 3, 4, and 5. As shown in FIG. 2, the results of the different tests may be indicated using an indicator such as an "X" under appropriate test names in connection with tested rows identified by key values. Here, the presence of the indicator "X" represents a test failure and the lack of "X" represents a test passed. For example, in this outcome table, the row entry identified by the key value of "011" is marked with "X" which indicates that this row has failed Test 1. The test failure may indicate a number of different things depending on the nature of the tests. For example, if the test was to detect data records that are obviously out of range, then the failure of this test would indicate that the particular data record is out of range and should be corrected. If the test is to determine whether any field in the row identified by the key value is missing entirely, the failure of this test would mean that there is no actual data stored in some field of that row.

In accordance with the present invention, the use of the SQL syntax, "WITH" and "LEFT OUTER JOIN", is now described. A WITH command is a relatively new SQL command and allows several queries to appear as one large query. The WITH command is defined in the SQL 1999 Standard set by ANSI/ISO (American National Standards Institute/International Standards Institute) and is described therein also as a "recursive select." It is used in databases such as DB2 and Ingres. In the present invention, a set of tests are defined as small queries. Then these queries are redefined as parts of a larger query using the WITH command so that the outcomes of the queries (test results) appear as fields (columns) of tables. The following is one example of high level pseudo-SQL syntax for redefining test queries as part of a larger query where the outcome of each query is declared as fields of a table as discussed above:

| L1: | WITH |
|---|---|
| L2: | Test1 (field1, field2) as (<query1>) |
| L3: | ,Test2 (field1, field2) as (<query2>) |
| L4: | SELECT |
| L5: | field1 |
| L6: | ,field2 |
| L7: | FROM |
| L8: | Test1 |
| L9: | ,Test2 |
| L10: | WHERE <conditions>... |

It should be understood that one skilled in SQL would readily appreciate the operation implemented by the above SQL syntax. For instance, lines L2 and L3 declare each small queries "query1" and "query2" (representing tests) which produce the fields "field1" and "field2" for each of two temporary tables named "Test1" and "Test2." In theory, there can be any number of these tests, subject to the performance constraints mentioned above. Each test, however, needs to define fields of the same name and type. This allows the outcome of the queries to be represented in these temporary tables. For each table "Test 1" and "Test 2," one of the fields "field1" and "field2" is a key field and the other field is an indicator field having certain values/characters for indicating test results. For example, if a failed test result is to be represented using an indicator "X" as in FIG. 2, then the indicator field will have either the "X" character or a NULL value for indicating the fail/pass test results. The WITH command at line L1 then allows the statements on lines L4–L10 to use the two tables Test1 and Test2 produced from the execution of lines L2 and L3 to form another query which is combined with the use of "LEFT OUTER JOIN" commands (not shown above) between the set of all keys and the set of keys returned for each test.

A LEFT OUTER JOIN command is a well-known SQL command which is used to align and associate certain fields. Here, for each field (e.g., 2, 3, 4 . . . n) of the test results, the LEFT OUTER JOIN command is used (e.g., in line L10) to align the keys of the results of each test performed with the set of all key values, so that, if desired, all keys are displayed in the first column of the outcome table, followed by columns indicating the test results with the use of an indicator such as "X" as in FIG. 2. One skilled in SQL syntax would understand the implementation and use of the LEFT OUTER JOIN command in the context described above to produce these desired results. For instance, one of the tables "Test1" and "Test2" would be produced by using a well known SQL command "SELECT" on all keys so that these tables can be used as the basis for using the LEFT OUTER JOIN command. In general, the first table in a LEFT OUTER JOIN (literally, the one on the left) is a superset which drives the number of rows in a test results set. In this example, columns to the right of this first table then will have the indicator value of either "X" or a NULL value.

The use of the WITH and LEFT OUTER JOIN commands allows the results of queries of underlying database tables or views, which are not constrained to have the same field parameters (the same field name and data type), to be declared as similar tables Test1, Test2, . . . Testn. Since these query results are then stored in tables having the same field parameters (field name and data type), a larger query can be written based on these results. That is, Test1, Test2, . . . Testn, gather raw information and set it all into the same context so that a larger query (lines L4–L10) can compare them all at once. In other embodiments, other SQL's OUTER JOIN syntaxes can be used as well in lieu of the LEFT OUTER JOIN command depending on the application and need.

Because it is often desirable to have an outcome table showing only those rows in database tables that have failed one or more tests (as shown in FIG. 2), constraints can be imposed (e.g., in line L10) so that at least one of the columns 2 through n in the outcome table have a non-NULL value.

The following is another example of high level pseudo-SQL syntax for running two tests simultaneously. Here, however, the tests are performed on one particular known key value although a set of known keys can be tested as well. This syntax is identical to the one shown above, except that the queries are executed by setting the condition (using "WHERE") that a key equals a known value. One skilled in SQL would readily appreciate the operation implemented by the below SQL syntax and thus, it will not be described further:

```
WITH
Test1 (field1, field2) as (
    <query1
    WHERE <key> = <known value>
    >
),
Test2 (field1, field2) as (
    <query2
    WHERE <key> = <known value>
    >
)
SELECT
    field1, field2
FROM
    Test1, Test2
WHERE <conditions>.
```

Figure 3:
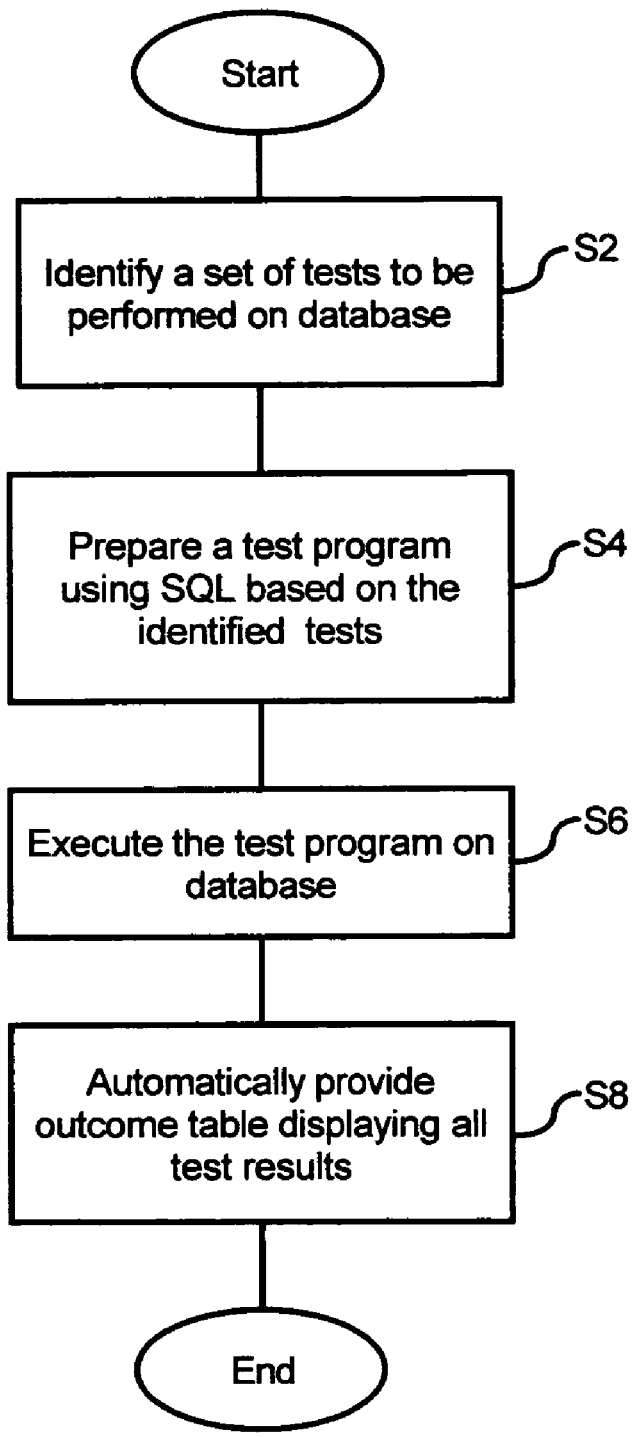
FIG. 3 is a flowchart illustrating the processing steps of a method for systematically diagnosing data problems in a database according to one embodiment of the present invention.

FIG. 3 is a flowchart illustrating the processing steps of a method for diagnosing data problems in a database according to one embodiment of the present invention. These processing steps can be implemented by the system 100 of FIG. 1. As shown in FIG. 3, in Step S2, a set of tests to be performed are identified by a DBA, operator or any other user who desires to run the tests on the database. In Step S4, a test program is prepared, e.g., by combining different test queries as a larger query using the WITH and LEFT OUTER JOIN commands in SQL based on the identified set of tests, as discussed above. The test program may be written manually by a programmer, or automatically by computer software. Also, Steps S2 and S4 can be performed at the initial setup of the system 100 or before the user is ready to run the tests. The test program is stored in the data integrity testing module 20 in the system 100.

In Step S6, the data integrity testing module 20 runs the test program on the database according to instructions from the user or whenever the testing of the database is desired. In Step S8, the results from all different tests are combined and displayed in an outcome table by running the test program. The user can view the outcome table to diagnose easily the nature and location of any problem in the database.

The outcome table can be displayed via any number of platforms. For example, the outcome table can be displayed on a web page of a particular website, or may be printed automatically on paper. The outcome table may be displayed using a display device of a handheld, laptop, or any computer device capable of communicating with the data integrity testing module 20.

The present invention contemplates as part of the invention that the use of the SQL commands "WITH" and "LEFT OUTER JOIN" may be substituted by using other programming techniques as long as the tests can be queried as parts of a larger query to display an outcome table.

Accordingly, the present invention provides a user with an effective and powerful problem diagnosing tool for databases. By simply running the test program and viewing the outcome table, the user can easily diagnose the nature and location of data problems in a database.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-implemented method of systematically diagnosing data problems in a database, comprising the steps of:

identifying a set of tests to be performed on the database, said set of tests comprising at least two tests, each defined as a small query having a predetermined size;

preparing a test program corresponding to the set of tests using SQL (Structured Query Language), wherein the preparing step is implemented using WITH and LEFT OUTER JOIN commands of SOL, and wherein the test program redefines said small queries to form a single refined query of a size larger than the predetermined size of any of said small queries;

executing the test program on the database to execute the refined query, so that the set of tests are performed on the database simultaneously; and automatically providing results of the test program in a predetermined format, whereby data problems in the data base can be diagnosed by viewing the results.

2. The method of claim 1, wherein the predetermined format is a table format.

3. The method of claim 1, wherein at least one of the set of tests involves performing a test on a particular record stored in a table of the database, said record being identifiable by one or a combination of key values.

4. The method of claim 1, wherein, in the preparing step, the test program is prepared manually.

5. The method of claim 1, wherein, in the preparing step, the test program is prepared by computer software.

6. The method of claim 1, wherein the preparing step includes:
 displaying a set of predetermined queries to a user;
 receiving the user's response to each of the predetermined queries; and
 preparing the test program based on the user's response.

7. A computer-implemented system for systematically diagnosing data problems in a database, comprising:
 a database including a plurality of tables, each table containing at least one row of data, each row identifiable by one or a combination of key values; and
 a testing module, coupled to the database, for storing a test program written in SQL (Structured Query Language); wherein the test program includes WITH and LEFT OUTER JOIN commands of SQL, executing the test program on the database, and automatically providing results of the test program in a predetermined format; wherein the test program corresponds to a collection of tests for diagnosing data problems in the database, said collection of tests comprising at least two tests, each defined as a small query having a predetermined size; and
 wherein the test program redefines said small queries to form a single refined query of a size larger than the predetermined size of any of said small queries 8. The system of claim 7, wherein the predetermined format is a table format.

9. The system of claim 7, wherein each of the collection of tests is represented by a query, and these queries are combined as a larger query using the WITH and OUTER JOIN commands.

10. The system of claim 7, wherein one of the collection of tests involves performing a test on a particular record stored in a table of the database, said record being identifiable by one or a combination of key values.

11. The system of claim 7, wherein the test program stored in the testing module is prepared manually.

12. The system of claim 7, wherein the test program stored in the testing module is prepared by computer software.

13. The system of claim 7, further comprising:
 an interface for displaying a set of predetermined queries to a user and receiving the user's response to each of the predetermined queries,
 wherein the test module prepares the test program based on the user's response.

14. A computer program product embodied on computer readable media readable by a computing device, for systematically diagnosing data problems in a database, the product comprising computer executable instructions for:
 identifying a set of tests to be performed on the database, said set of tests comprising at least two tests, each defined as a small query having a predetermined size;
 preparing a test program corresponding to the set of tests using SQL (structured query language), wherein the preparing instructions are performed using WITH and LEFT OUTER JOIN commands of SQL, and wherein the test program redefines said small queries to form a single refined query of a size larger than the predetermined size of any of said small queries;
 executing the test program on the database to execute the refined query, so that the set of tests are performed on the database simultaneously; and
 automatically providing results of the test program in a predetermined format, whereby data problems in the data base can be diagnosed systematically.

15. The computer program product of claim 14, wherein the predetermined format is a table format.

16. The computer program product of claim 14, wherein one of the set of tests involves performing a test on a particular record stored in a table of the database, said record being identifiable by one or a combination of key values.

17. The computer program product of claim 14, wherein the preparing instructions include computer executable instructions for:
 displaying a set of predetermined queries to a user;
 receiving the user's response to each of the predetermined queries; and
 preparing the test program based on the user's response.

* * * * *